United States Patent
Shih

(10) Patent No.: US 11,209,047 B1
(45) Date of Patent: Dec. 28, 2021

(54) LIQUID GUIDING STRUCTURE FOR FLUID DYNAMIC PRESSURE BEARING

(71) Applicant: John Wun-Chang Shih, Hsinchu County (TW)

(72) Inventor: John Wun-Chang Shih, Hsinchu County (TW)

( * ) Notice: Subject to any disclaimer, the term of this patent is extended or adjusted under 35 U.S.C. 154(b) by 0 days.

(21) Appl. No.: 16/928,013

(22) Filed: Jul. 14, 2020

(51) Int. Cl.
  *F16C 33/10* (2006.01)
  *F16C 17/02* (2006.01)

(52) U.S. Cl.
  CPC ........ *F16C 33/1015* (2013.01); *F16C 17/026* (2013.01); *F16C 33/107* (2013.01)

(58) Field of Classification Search
  CPC .... F16C 17/026; F16C 17/045; F16C 17/102; F16C 17/105; F16C 17/107; F16C 33/1015; F16C 33/104; F16C 33/107
  See application file for complete search history.

(56) References Cited

U.S. PATENT DOCUMENTS

| | | | | |
|---|---|---|---|---|
| 6,914,358 B2 * | 7/2005 | Tokunaga | ............. | F16C 17/107 310/90 |
| 2001/0025420 A1 * | 10/2001 | Usui | ....................... | B23P 13/02 29/898 |
| 2002/0051589 A1 * | 5/2002 | Saito | ....................... | F16C 17/08 384/107 |
| 2003/0093902 A1 * | 5/2003 | Hsu | ....................... | B21D 26/14 29/898.02 |
| 2003/0198414 A1 * | 10/2003 | Horng | ....................... | F16C 17/02 384/291 |
| 2006/0039633 A1 * | 2/2006 | Huang | ................... | F16C 17/026 384/100 |
| 2013/0272634 A1 * | 10/2013 | Kokumai | ................. | F16C 32/06 384/114 |
| 2016/0230769 A1 * | 8/2016 | Komatsubara | ........ | F04D 25/062 |

FOREIGN PATENT DOCUMENTS

JP 2000346055 A * 12/2000 ............ F16C 17/026

* cited by examiner

Primary Examiner — Alan B Waits

(57) ABSTRACT

A liquid guiding structure for a fluid dynamic pressure bearing, comprising: a fluid dynamic pressure bearing having an inner recess chamber and a liquid guiding trench which is formed between two sides of the inner recess chamber so as to form a circular close liquid guiding structure; wherein the liquid guiding trench includes at least two small V shape paths and at least one large V shape path; the large V shape path is larger than the small V shape paths and is located between the at least two small V shape paths. First angles at tip ends of the at least two small V shape paths are equal. A second angle between connections of the small V shape path and a respective large V shape path is larger than the first angle at tip ends of the at least two small V shape paths.

7 Claims, 2 Drawing Sheets

LIQUID GUIDING STRUCTURE FOR FLUID DYNAMIC PRESSURE BEARING

FIELD OF THE INVENTION

The present invention is related to bearings, and in particular to a liquid guiding structure for a fluid dynamic pressure bearing.

BACKGROUND OF THE INVENTION

In general, the conventional fluid dynamic pressure bearing is unidirectional. As a result, the prior fluid dynamic pressure bearing cannot rotate bidirectionally.

Therefore the present invention serves to improve this defect of prior art so that one fluid dynamic pressure bearing has the function of bidirectional rotation which is practical and useful.

SUMMARY OF THE INVENTION

Accordingly, the object of the present invention is to provide a liquid guiding structure for a fluid dynamic pressure bearing, wherein by a large V shape path and small V shape paths at two sides of a large V shape path, the fluid flows in opposite directions along the paths of the large V shape path and small V shape paths so that large dynamic pressures are generated between the bearing and rotation shaft which do not contact with one another. Therefore a preferred bearing effect is generated by the structure of the present invention with a simple structure. The preened invention can be widely used in common two direction flowing dynamic pressure bearing with a common liquid guiding trench.

To achieve above object, the present invention provides a liquid guiding structure for a fluid dynamic pressure bearing, comprising: a fluid dynamic pressure bearing having an inner recess chamber (1) and a liquid guiding trench (2) which is formed from one side of the inner recess chamber to another side of the inner recess chamber so as to form a circular close liquid guiding structure; wherein the liquid guiding trench (2) includes at least two small V shape paths (21) and at least one large V shape path (22); the large V shape path is larger than the small V shape paths and is located between the at least two small V shape paths.

First angles (21A) at tip ends of the at least two small V shape paths are equal.

A second angle (22A) between connections of the small V shape path (21A) and a respective large V shape path (22) is larger than the first angle (21A) at tip ends of the at least two small V shape paths (21).

All longitudinal lengths (21B) from an upper end to a lower tip end of V shapes of the small V shape paths (21A) are equal, and all widths (21C) from one end of the upper side to another end of the upper side of the V shapes of the small V shape paths 21A are equal.

A number of the small V shape paths (21) at one side from a left end of the large V shape path (22) to the inner recess chamber (1) and a number of the small V shape paths (21) from another end of the large V shape path (22) to the inner recess chamber (1) are equal.

All longitudinal lengths (21B) from an upper side to a lower tip end of the V shapes of the small V shape paths (21) is larger than then a longitudinal length (1A) of the inner recess chamber (1), and smaller than the longitudinal length (22B) from the upper side to a lower tip end of the large V shape path (22).

A transversal width (1B) of the inner recess chamber (1) is larger than each transversal width (21C) of each smaller V shape path (21); and a transversal width (1B) of the inner recess chamber (1) is equal to or larger than each transversal width (22C) of the large V shape path (22).

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
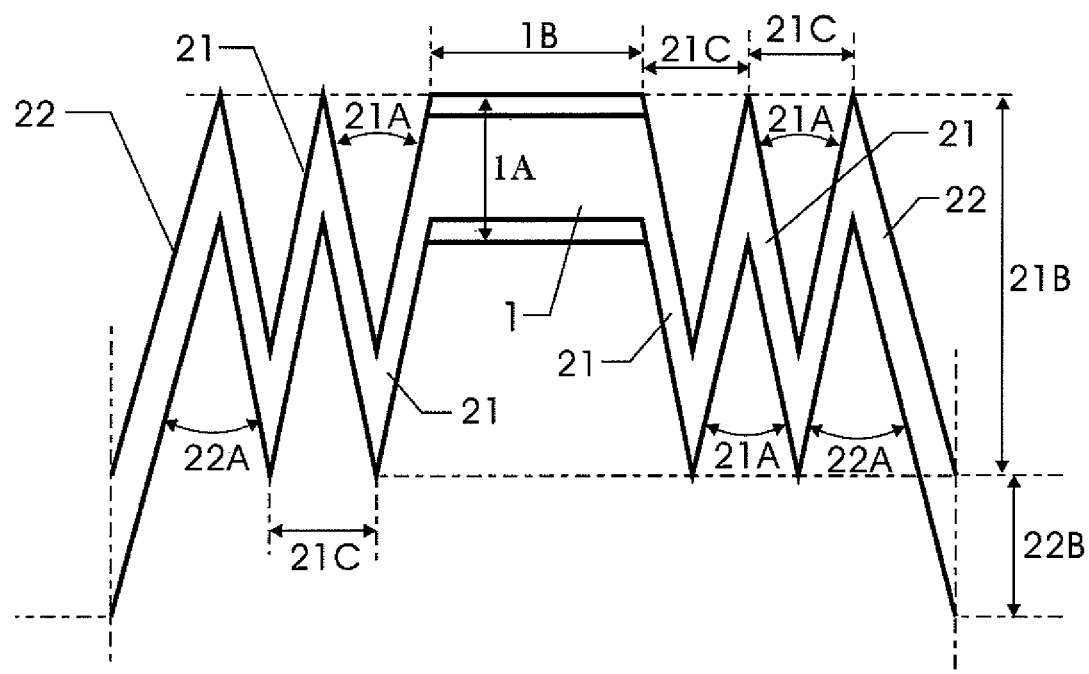
FIG. 1 is a plane view showing the liquid guiding trench of the present invention.
Figure 2:
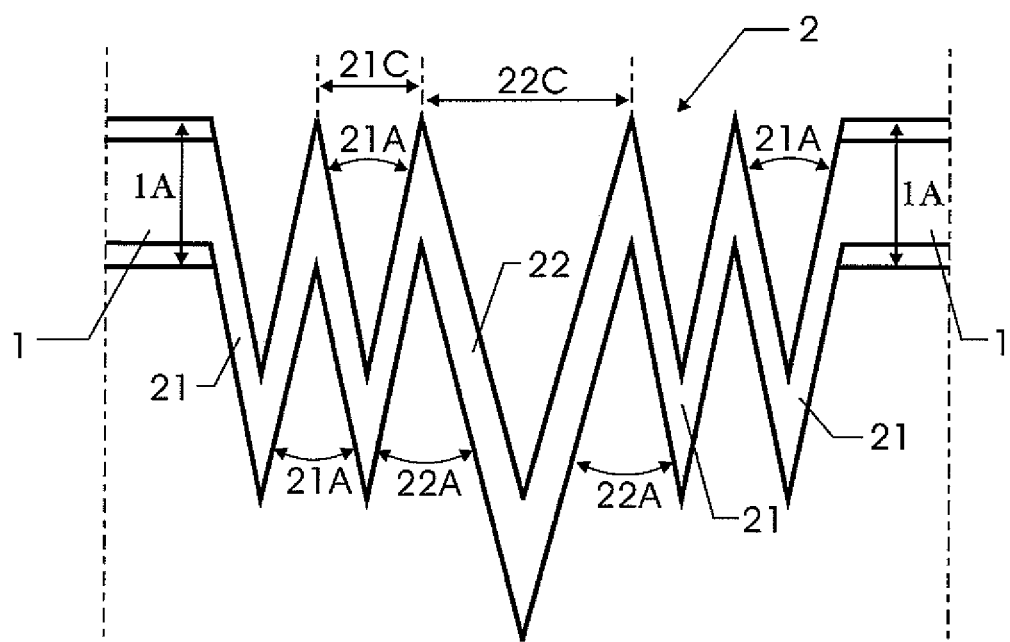
FIG. 2 is another plane view about the liquid guiding trench of the present invention.

With reference to FIGS. 1 and 2, the structure of the present invention is illustrated. The present invention includes the following elements.

A fluid dynamic pressure bearing has an inner recess chamber 1 and a liquid guiding trench 2 which is formed from one side of the inner recess chamber 1 to another side of the inner recess chamber 1 so as to form a circular close liquid guiding structure.

The liquid guiding trench 2 includes at least two small V shape paths 21 and at least one large V shape path 22 (in FIG. 1, only one large V shape path is shown for description). The large V shape path is larger than the small V shape paths and is located between the at least two small V shape paths 21.

With reference to FIGS. 1 and 2, first angles 21A at tip ends of the at least two small V shape paths 21 are equal. A second angle 22A between connections of the small V shape path 21A and a respective large V shape path 22 is larger than the first angle 21A at tip ends of the at least two small V shape paths 21. All longitudinal lengths 21B from an upper end to a lower tip end of the V shapes of the small V shape paths 21A are equal, and all widths 21C from one end of the upper side to another end of the upper side of the V shapes of the small V shape paths 21A are equal. The number of the small V shape paths 21 at one side from a left end of the large V shape path 22 to the inner recess chamber 1 and the number of the small V shape paths 21 from another end of the large V shape path 22 to the inner recess chamber 1 are equal.

All longitudinal lengths 21B from an upper side to a lower tip end of the V shapes of the small V shape paths 21 is larger than then the longitudinal length 1A of the inner recess chamber 1, and smaller than the longitudinal length 22B from the upper side to a lower tip end of the large V shape path 22. A transversal width 1B of the inner recess chamber 1 is larger than each transversal width 21C of each smaller V shape path 21. A transversal width 1B of the inner recess chamber 1 is equal to or larger than each transversal width 22C of the large V shape path 22.

By the large V shape path and small V shape paths at two sides of the large V shape path. The fluid may flow in opposite directions along the paths of the large V shape path and small V shape paths so that large dynamic pressures are generated between the bearing and rotation shaft which do not contact with one another. Therefore a preferred bearing effect is generated by the structure of the present invention with a simple structure. The preened invention can be widely used in common two direction flowing dynamic pressure bearing with a common liquid guiding trench.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A liquid guiding structure for a fluid dynamic pressure bearing, comprising:
   a radial fluid dynamic pressure groove having an inner recess chamber (1) and a liquid guiding trench (2) which is formed from one side of the inner recess chamber to another side of the inner recess chamber so that the inner recess chamber (1) and the liquid guiding trench (2) form a closed circular liquid guiding structure;
   wherein the liquid guiding trench (2) includes at least two first V shape paths (21) and at least one second V shape path (22); the second V shape path is larger than the first V shape paths and is located between the at least two first V shape paths.

2. The liquid guiding structure for a fluid dynamic pressure bearing as claimed in claim 1, wherein first angles (21A) at tip ends of the at least two first V shape paths are equal.

3. The liquid guiding structure for a fluid dynamic pressure bearing as claimed in claim 1, wherein a second angle (22A) between connections of the first V shape path (21) and a respective second V shape path (22) is larger than the first angle (21A) at tip ends of the at least two first V shape paths (21).

4. The liquid guiding structure for a fluid dynamic pressure bearing as claimed in claim 1, wherein all longitudinal lengths (21B) from an upper end to a lower tip end of V shapes of the first V shape paths (21) are equal, and all widths (21C) from one end of a upper side to another end of the upper side of the V shapes of the first V shape paths (21) are equal.

5. The liquid guiding structure for a fluid dynamic pressure bearing as claimed in claim 1, wherein a number of the first V shape paths (21) at one side from a first circumferential end of the second V shape path (22) to the inner recess chamber (1) and a number of the first V shape paths (21) from a second circumferential end of the second V shape path (22) to the inner recess chamber (1) are equal.

6. The liquid guiding structure for a fluid dynamic pressure bearing as claimed in claim 1, wherein all longitudinal lengths (21B) from an upper side to a lower tip end of the V shapes of the first V shape paths (21) is larger than a longitudinal length (1A) from an upper side to a lower side of the inner recess chamber (1), and smaller than a longitudinal length (22B) from an upper side to a lower tip end of the second V shape path (22).

7. The liquid guiding structure for a fluid dynamic pressure bearing as claimed in claim 1, wherein a transversal width (1B) of the inner recess chamber (1) is larger than each transversal width (21C) from one end of an upper side to another end of the upper side of the V shape of each first V shape path (21); and the transversal width (1B) of the inner recess chamber (1) is equal to or larger than each transversal width (22C) from one end of an upper side to another end of the upper side of the V shape of the second V shape path (22); and wherein the transversal width (1B) is perpendicular to a longitudinal length (1A) from an upper side to a lower side of the inner recess chamber (1).

* * * * *